United States Patent
Jin et al.

(10) Patent No.: US 12,491,585 B2
(45) Date of Patent: Dec. 9, 2025

(54) LOW SILVER SOLDER FOR WELDING THE ELECTRIC VACUUM DEVICE AND A PREPARATION METHOD THEREOF

(71) Applicant: HANGZHOU HUAGUANG ADVANCED WELDING MATERIALS CO., LTD., Hangzhou (CN)

(72) Inventors: Limei Jin, Hangzhou (CN); Sihong Wang, Hangzhou (CN); Shisheng Huang, Hangzhou (CN); Ling Hu, Hangzhou (CN)

(73) Assignee: HANGZHOU HUAGUANG ADVANCED WELDING MATERIALS CO., LTD., Hangzhou (CN)

( * ) Notice: Subject to any disclaimer, the term of this patent is extended or adjusted under 35 U.S.C. 154(b) by 308 days.

(21) Appl. No.: 17/890,577

(22) Filed: Aug. 18, 2022

(65) Prior Publication Data
US 2023/0048036 A1  Feb. 16, 2023

Related U.S. Application Data

(63) Continuation-in-part of application No. PCT/CN2021/079450, filed on Mar. 7, 2021.

(30) Foreign Application Priority Data

Dec. 4, 2020 (CN) .......................... 202011403925.2

(51) Int. Cl.
| | |
|---|---|
| C22C 5/08 | (2006.01) |
| B23K 35/30 | (2006.01) |
| B23K 35/40 | (2006.01) |
| C22C 1/02 | (2006.01) |
| B23K 101/36 | (2006.01) |

(52) U.S. Cl.
CPC .......... *B23K 35/3006* (2013.01); *B23K 35/40* (2013.01); *C22C 1/02* (2013.01); *C22C 5/08* (2013.01); *B23K 2101/36* (2018.08)

(58) Field of Classification Search
CPC ............. B23K 35/3006; B23K 35/40; B23K 2101/36; C22C 1/02; C22C 1/03; C22C 5/08

USPC ......................................... 420/502
See application file for complete search history.

(56) References Cited

U.S. PATENT DOCUMENTS

| | | | | |
|---|---|---|---|---|
| 1,928,429 | A | * | 9/1933 | Leach ....................... C22C 5/08 200/266 |
| 4,883,745 | A | * | 11/1989 | Mizuhara .................. C22C 5/08 428/606 |
| 6,413,649 | B2 | | 7/2002 | Kepniss et al. |

FOREIGN PATENT DOCUMENTS

| | | |
|---|---|---|
| CN | 105033500 A | 11/2015 |
| CN | 105965175 A | 9/2016 |
| CN | 108161274 A | 6/2018 |
| CN | 112108790 A | 12/2020 |
| JP | 57187195 A | 11/1982 |
| JP | 2693591 B2 * | 12/1997 ......... B23K 35/3006 |

OTHER PUBLICATIONS

Aufhauser SilverAlloy BV-68 https://www.brazing.com/products/Brazing_alloys/SA_BV68.aspx Wayback Machine Feb. 6, 2017 https://web.archive.org/web/20170206235922/https://www.brazing.com/products/Brazing_alloys/SA_BV68.aspx (Year: 2017).*
JPlat Pat Machine Translation of JP 2693591 and/or JP 03-059922 A (Year: 2025).*
International search report of PCT/CN2021/079450.

* cited by examiner

*Primary Examiner* — Alexandra M Moore

(57) ABSTRACT

A silver solder for welding an electric vacuum device consisting of the following components in percentage by mass: 65-71% of Ag, 0-0.1% of Ni, 0-0.1% of trace element R and balance of Cu; the trace element R consists of one or more of P, Sc, Be, Zr and La. A method of producing the silver solder, comprising the steps of: evenly presetting Ag, Cu except from copper foil and Ni in a smelting crucible, placing the trace element R wrapped by the copper foil above the Ag, Cu except from copper foil and Ni, then smelting and casting the Ag, Cu but except from copper foil, Ni and the trace element R by adopting a vacuum induction smelting furnace, the vacuum degree of the furnace reaches $10^{-1}$ Pa during smelting and casting, and finally a strip material or a wire material is prepared by a post treatment process.

3 Claims, 1 Drawing Sheet

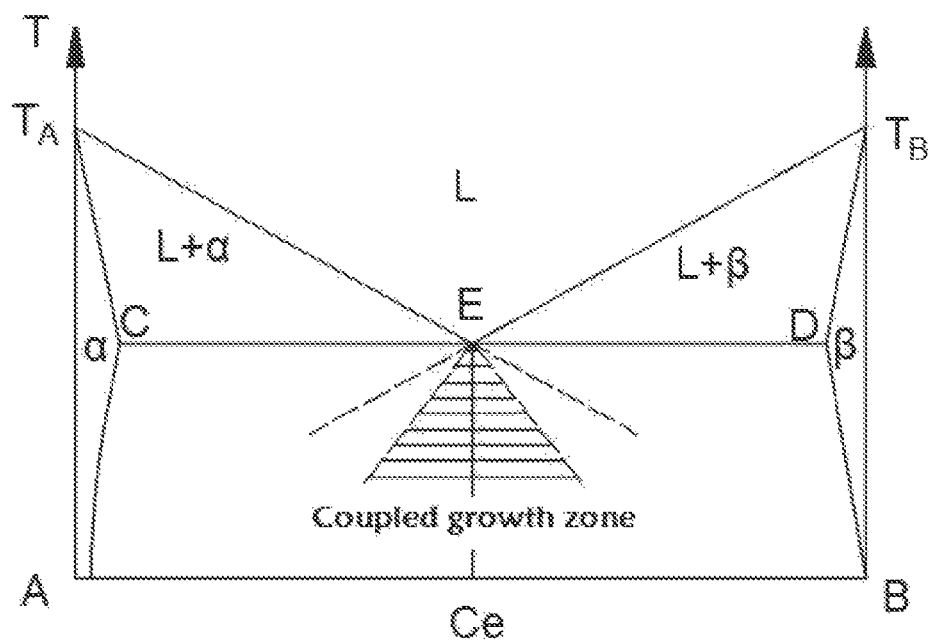

LOW SILVER SOLDER FOR WELDING THE ELECTRIC VACUUM DEVICE AND A PREPARATION METHOD THEREOF

CROSS REFERENCE TO RELATED APPLICATION

This application is a continuation-in-part application of International Patent Application No. PCT/CN2021/079450, filed on Mar. 7, 2021, which claims priority benefit of Chinese Invent Application No. 202011403925.2, filed on Dec. 4, 2020, and the entire contents of which are incorporated herein by reference.

TECHNICAL FIELD

The application relates to a low-silver solder for welding an electric vacuum device and a preparation method thereof, which are mainly suitable for welding the electric vacuum device.

BACKGROUND

An electric vacuum device is a component with a complex structure formed by connecting a plurality of materials (including metal and nonmetal) by a welding method, the high vacuum is required to be maintained for a long time in working, baking and exhausting are usually carried out for a long time at high temperature (above 500° C.) in the manufacturing process, and silver-copper brazing filler metal with lower vapor pressure, stronger reliability and good fluidity is usually selected for brazing, such as BAg72Cu and BAg71.5CuNi. However, with the increasing price of precious metal raw materials, manufacturers using silver solder for soldering face huge cost pressure. If the content of silver in the brazing filler metal is simply reduced, the melting temperature of the brazing filler metal is increased, for example, the melting temperature of BAg50Cu in GB/T10046-2018 is 780-875° C., the melting temperature of BAg56CuNi is increased by 95° C. compared with BAg72Cu, the melting temperature of BAg56CuNi is 785-870° C., and the melting temperature of BAg72Cu is increased by 90° C. Some solders also adopt low melting point elements to reduce the melting temperature of the solder, such as the melting temperature of BAg62CuIn in GB/T10046-2018 is 624-707° C. and the melting temperature of BAg60CuSn is 600-730° C. Although these low silver solders also lower the melting temperature of the material while saving silver, there are other negative effects: for example, the processing performance can be influenced rapidly by adding too high In and Sn elements; the solid-liquid interval of the brazing filler metal is increased, the viscosity of the brazing filler metal during melting is increased, the fluidity is influenced, and meanwhile, the solidification shrinkage is more severe during brazing, and the filling degree of a welding seam is influenced; the lowered solidus of the solder may also adversely affect the high temperature performance of the joint.

Therefore, it is necessary to provide a solder with low silver content and good soldering performance and joint stability.

The invention patent of the publication number CN108161274A discloses a sealing material for an electric vacuum device and a preparation method thereof, wherein the invention patent comprises 30-45% of copper, 0.1-2.0% of nickel, 0-5% of indium, 0-2% of titanium and the balance of silver, the processing performance and the wettability are improved by adding nickel into silver solder, the melting temperature of the solder is reduced by adding indium, the activity of the solder is improved by adding titanium, but the melting temperature is higher, segregation is easy to generate during soldering of a manufactured welding wire, and poor melting is caused; the invention discloses a silver-based brazing filler metal with low melting point and high plasticity in a Chinese patent publication No. CN110695567A, wherein the content of copper is 27-32%, the content of silver is 55-60%, the content of indium is 5-9%, the content of gallium is 6-10%, the melting temperature of the brazing filler metal is reduced by adding gallium and indium with higher solubility, and the processing performance is guaranteed at the same time.

DISCLOSURE OF INVENTION

The technical problem solved by the application is to overcome the defects in the prior art, and provide the low-silver solder for welding the electric vacuum device, which has the advantages of good processing performance, good fluidity, low air content in a welding line and excellent thermal stability, and the preparation method thereof.

The technical scheme that this application solved above-mentioned technical problem and adopted includes: the low-silver solder for welding the electric vacuum device is characterized by consisting of Ag, Cu, Ni and a trace element R, wherein the low-silver solder comprises the following components in percentage by mass: 65-71% of Ag, 0-0.1% of Ni, 0-0.1% of trace element R and the balance (27.9-35%) of Cu; the trace element R consists of one or more of P, Sc, Be, Zr and La.

The mass percentages of the components are as follows: 66-69% of Ag, 0-0.1% of Ni, 0.0001-0.01% of trace element R and the balance of Cu; the trace element R is prepared by adding Cu—R alloy, and consists of one or more of P, Sc, Be, Zr and La.

The technical scheme that this application solved above-mentioned technical problem and adopted also includes: the preparation method of the low-silver solder for welding the electric vacuum device is characterized by comprising the following steps of: Ag, Cu but not from copper foil and Ni are evenly preset in a smelting crucible, trace elements (Cu—R alloy) wrapped by the copper foil are placed above main raw materials consisting of the Ag,Cu but not from copper foil and Ni, which are not in direct contact with the crucible, then a vacuum induction smelting furnace is adopted for smelting and casting, the vacuum degree of a furnace body is required to reach $10^{-1}$ Pa during smelting and casting, and finally the materials are prepared into strips or wires through the post treatment processes of sawing, rolling, drawing, cleaning and the like as described in the prior art. In the manufacturing method, the vapor pressure or the melting point of the added R element is higher, the copper element is divided into two parts, Cu and Cu except from the copper foil, and the adding mode of the Cu—R alloy wrapped by the copper foil is favorable for the full melting of the R element and the alloy solution; when the Cu—R alloy is added, the crucible is not directly contacted, so that the melting sequence of raw materials during melting can be ensured, and the phenomenon that the Cu—R alloy is heated too quickly and burnt in advance to cause failure in due effect can be avoided.

The weight of the copper foil is 0.01-30 g.

Compared with the prior art, the application has the following advantages and effects: 1. compared with the prior BAg62CuIn and BAg60CuSn silver solder, the silver solder has better processing performance and better fluidity, and can obtain a welding seam with higher reliability; 2. compared with the low-silver products on the market, the low-melting-point elements such as In, Sn, Ga and the like are not added, and the reduction of the thermal stability of the welding seam caused by the reduction of the solidus line is avoided; 3. some low silver products on the market only reduce silver copper proportion as low silver solder through simple, but the change of solder composition tissue can lead to when the solder melts that the mobility is not enough, solidification shrink aggravation, the air content is higher in the welding seam, release gas at the device during operation, influence cavity vacuum, this application passes through trace element R's interpolation, can improve the solder mobility, air content in the reduction welding seam, guarantee the cavity vacuum of device during operation, comprehensive properties is good.

DRAWINGS

The figure is a schematic diagram of an embodiment of the present application, in which:

A represents pure element A, Ag in this example;
B represents pure element B, Cu in this example;
C represents the maximum solid solubility of the element B in A;
D represents the maximum solid solubility of the element A in the element B;
E represents a eutectic point;
TA represents the melting point of pure A;
Tb denotes the melting point of pure B;
Ce represents a component corresponding to the eutectic point;
L represents a liquid phase;
α represents a solid solution phase of A;
β represents a solid solution phase of B;
1+α represents a solid-liquid coexisting phase of A;
1+β represents a solid-liquid coexisting phase of B.

DETAILED DESCRIPTION

The present application will be described in further detail below by way of examples with reference to the accompanying drawings, which are illustrative of the present application and are not intended to limit the present application.

The low-silver solder for welding the electric vacuum device is characterized by comprising Ag, Cu, Ni and a trace element R, wherein the low-silver solder comprises the following components in percentage by mass: 65-71% of Ag, 0-0.1% of Ni, 0-0.1% of trace element R, and the balance (27.9-35%) of Cu; the trace element R consists of one or more of P, Sc, Be, Zr and La.

According to the solder, the wettability of the solder on the surfaces of steel, stainless steel and kovar alloy can be improved, the material structure is refined, the processing performance of the material is improved, the joint strength is improved, when 0-0.1% of Ni is added in the range, the influence on the melting temperature of the solder is small, the soldering temperature cannot be improved, the wettability of the solder and the joint strength are improved continuously along with the continuous increase of the Ni content, but when the Ni content exceeds 0.1%, a Ni-containing phase with the melting temperature is easy to generate, and the soldering of an electric vacuum device is not facilitated.

The addition of trace R elements has the functions of impurity removal and degassing during smelting, the addition of a small amount of trace R elements can increase the fluidity of the solder during soldering, fill up micropores in a welding seam when the solder is solidified and shrunk, play a role of secondary degassing during soldering and ensure the vacuum degree of a cavity when a device works. When the addition range of the trace element R is 0.0001-0.01%, the trace element R has high fluidity, welding seam filling performance and degassing effect, the degassing effect is enhanced along with the increase of the content of the trace element R, but the fluidity of the solder can be reduced, and when the addition amount reaches more than 0.1%, the fluidity of the solder is influenced to a great extent, and the defects of welding shortage, refractory property and the like can be caused.

In addition, as shown in figure, according to the "intergrowth" theory, for an alloy system capable of forming a binary eutectic structure, the composition of which is within a certain range of radiation near the eutectic point, the structure tends to grow toward the eutectic. The addition of the trace element R during smelting can enlarge the symbiotic region of the trace element R, so that the material components can still grow to the eutectic structure even if the material components slightly deviate from the original "symbiotic region". In the silver-copper binary system, the physical processing performance and the soldering performance of the low-silver solder are closer to those of BAg72Cu by the existence of eutectic structures, and the low-silver solder is more suitable for soldering of electric vacuum devices. Meanwhile, the Ag content is controlled to be more than 65%, the material tends to grow towards an eutectic structure, when the Ag content is less than 65%, an obvious alpha-Cu phase appears in the structure, segregation easily appears during soldering, and defects such as infusibility, incomplete melting and the like are generated.

The embodiment is as follows:
the low-silver solder in the embodiment is prepared by using silver IC—Ag99.99, oxygen-free copper, Ni99.995 and a trace Cu—R alloy according to the proportion, smelting and casting by using a vacuum intermediate-frequency smelting furnace, and then performing processes such as sawing, extruding, drawing, forming, cleaning and the like.

According to the embodiment of the application, a main raw material consisting of Cu except from copper foil and Ni is evenly preset in a smelting crucible before smelting, trace elements wrapped by the copper foil are arranged above the main raw material and are not in direct contact with the crucible, the vacuum degree of a furnace body is required to reach $10^{-1}$ Pa during smelting and casting, and then the materials are prepared into strips or wires through the processes of sawing, rolling, drawing, cleaning and the like. The melting temperature of the obtained solder ranges from 780° C. to 795° C., and the solder can be processed into solders such as welding wires, thin strips and welding pieces with various specifications and sizes.

The low-silver solder for the electric vacuum device does not contain In, Sn and Ga low-melting-point elements, is low In total content of precious metals, low In cost, good In fluidity, low In gas content of welding seams and high In joint reliability, has main technical indexes close to those of silver solder BAg72Cu, and can replace the application of the low-silver solder In the electric vacuum device. The present application will be described in further detail with reference to specific examples, which are illustrative of the present application and are not intended to limit the present application.

Specific parameters in each example are shown in tables 1 to 2, table 1 is a table of data related to examples 1 to 6 of the present application, table 2 is a table of data related to examples 7 to 12 of the present application, and data in each table are mass percentages and are specifically as follows.

TABLE 1 data table relating to examples 1 to 6.

| Component or parameter names | example 1 | example 2 | example 3 | example 4 | example 5 | example 6 |
|---|---|---|---|---|---|---|
| Ag | 71 | 70 | 69 | 68 | 67 | 66 |
| Cu | remainder | remainder | remainder | remainder | remainder | remainder |
| Ni | 0 | 0.05 | 0.1 | 0.3 | 0.2 | 0.1 |
| R | 0.01 | 0.0005 | 0 | 0.001 | 0.1 | 0.2 |
| Low air content of welding seam | low | low | high | low | low | low |
| Excellent and poor in stainless steel wettability | medium | excellent | excellent | excellent | excellent | excellent |
| Excellent fluidity | excellent | excellent | excellent | excellent | medium | poor |

Note: wherein the combination of the R elements in each embodiment is as follows: Sc and Be in example 1, Zr in example 2, P in example 4, P, Zr, Be in example 5, and Zr, La in example 6.

TABLE 2 data sheet relating to examples 7 to 12

| Component or parameter names | example 7 | example 8 | example 9 | example 10 | example 11 | example 12 |
|---|---|---|---|---|---|---|
| Ag | 65 | 64.5 | 68 | 67.5 | 66.5 | 65.5 |
| Cu | remainder | remainder | remainder | remainder | remainder | remainder |
| Ni | 0.2 | 0.5 | 0.02 | 1.5 | 0.08 | 0 |
| R | 0.01 | 0.003 | 0.005 | 0.002 | 0.1 | 0.15 |
| Low air content of welding seam | low | low | low | low | low | low |
| Excellent and poor in stainless steel wettability | excellent | excellent | excellent | excellent | excellent | poor |
| Excellent fluidity | excellent | poor | excellent | excellent | medium | poor |

Note: wherein the combination of the R elements in each embodiment is as follows: se and P in example 7, Be in example 8, Zr in example 9, Sc in example 10, La in example 11, and Be, La, Zr in example 12.

The formula of the embodiment of the application has the advantages of reasonable design, low production cost and high cost performance, and when the soldering alloy is used for solder electric vacuum devices, the soldering alloy has good wettability and fluidity, the surface of a brazed joint is smooth and clean, a welding line is compact, the problem of segregation and infusibility cannot be caused, and the soldering process performance is excellent.

What is claimed is:

1. A low silver solder for welding an electric vacuum device, consisting of Ag, Cu, Ni and a trace element R, wherein the low silver solder consists of the following components in percentage by mass: 65-71% of Ag, 0.02-0.1 of Ni, 0.0001-0.1% of trace element R and the balance of Cu; the trace element R is selected from Sc, Be, Zr and/or La.

2. The low silver solder according to claim 1, wherein a mass percent of the trace element R in the low silver solder is 0.0005-0.01 percent.

3. The low silver solder according to claim 1, wherein a mass percent of the element Ni in the low silver solder is 0.05-0.08 percent.

* * * * *